United States Patent [19]

de Montigny et al.

[11] 4,177,201

[45] Dec. 4, 1979

[54] PREPARATION OF SILICON-FUNCTIONAL POLYORGANOSILOXANES

[75] Inventors: Armand de Montigny, Leverkusen; Hans-Heinrich Moretto, Cologne, both of Fed. Rep. of Germany

[73] Assignee: Bayer Aktiengesellschaft, Leverkusen, Fed. Rep. of Germany

[21] Appl. No.: 974,412

[22] Filed: Dec. 29, 1978

[30] Foreign Application Priority Data

Jan. 21, 1978 [DE] Fed. Rep. of Germany ....... 2802668

[51] Int. Cl.$^2$ .............................................. C07F 7/08
[52] U.S. Cl. .............................................. 260/448.2 E
[58] Field of Search ................................ 260/448.2 E

[56] References Cited

U.S. PATENT DOCUMENTS

| | | | |
|---|---|---|---|
| 3,109,013 | 10/1963 | Haluska | 260/448.2 E |
| 3,356,758 | 12/1967 | Omietanski et al. | 260/448.2 E X |
| 3,595,885 | 7/1971 | Rossmy et al. | 260/448.2 E X |
| 3,819,674 | 6/1974 | Rudolp et al. | 260/448.2 E |
| 4,078,801 | 2/1978 | Moretto et al. | 260/448.2 E |
| 4,113,760 | 9/1978 | Frey et al. | 260/448.2 E |

*Primary Examiner*—Paul F. Shaver
*Attorney, Agent, or Firm*—Sprung, Felfe, Horn, Lynch & Kramer

[57] ABSTRACT

A process for the preparation of an equilibrated acyloxy-containing organopolysiloxane comprising reacting at a temperature of up to 135° C. a chlorosilane of the formula $$R_aR'_bSiCl_{(4-a-b)}$$

wherein
a=0, 1, 2 or 3
b=0, 1, 2 or 3, and
a+b is at most 3, or a partial hydrolysis product thereof, with at least one organosiloxane containing the units $$[R_2R''\text{—}SiO_{1/2}] \ [RR''\text{—}SiO] \ [R''\text{—}SiO_{3/2}] \ [SiO_2]$$

wherein
R and R' each independently is hydrogen or an optionally halogen or cyano-substituted monovalent hydrocarbon radical with up to 18 C atoms, and
R'' is hydrogen, chlorine, hydroxyl, or an optionally halogen or cyano-substituted monovalent hydrocarbon radical with up to 18 C atoms, in the presence of a proton acid siloxane-equilibration catalyst, and at least about 1.1 times the molar amount of a monobasic carboxylic acid based on the silicon-bonded chlorine atom, the number of all the Si—Cl groups in the reactants exceeding the number of all the Si—OH groups.

4 Claims, No Drawings

PREPARATION OF SILICON-FUNCTIONAL POLYORGANOSILOXANES

The present invention relates to the preparation of linear or branched silicon-functional polyorganosiloxanes by reaction of chlorosiloxanes or chlorosilanes with linear or branched polyorganosiloxanes in the presence of a combination of catalytic amounts of nonvolatile equilibration catalysts, in the form of proton acids, and monobasic carboxylic acids, such as, for example, acetic acid or propionic acid.

Linear and branched silicon-functional polyorganosiloxanes, such as, for example, siloxanes with terminal Si-bonded chlorine atoms or acetoxy radicals, are starting materials for a plurality of materials containing organopolysiloxanes, since they are suitable for reaction with reactive hydrogen atoms, such as are present, for example, in alcohols, amines and many other compounds. They are thus used, inter alia, for the preparation of polyether/polysiloxane copolymers, which, because of their surface-active properties, have found broad industrial application, for example as stabilizers for the production of polyurethane foam, as well as of other block copolymers. Attempts to prepare silicon-functional polyorganosiloxanes have hitherto been concentrated, above all, on the preparation of so-called chlorosiloxanes. Thus, chlorine-containing organopolysiloxanes were hitherto prepared either by incomplete hydrolysis of organochlorosilanes (compare, for example, U.S. Pat. No. 2,381,366, DT-AS (German Published Specification) No. 1,174,509 and DT-OS (German Published Specification) No. 2,345,923), or by reaction of chlorosilanes with, above all, cyclic siloxanes in the presence of catalysts, such as, for example, $FeCl_3$ and/or HCl (U.S. Pat. No. 2,421,653) or phosphine oxides (U.S. Pat. No. 3,162,662). Quaternary ammonium salts are also used for opening the ring of cyclotrisiloxanes in the presence of chlorosilanes in order to obtain chlorosiloxanes (U.S. Pat. No. 3,162,662). Catalyst mixtures, such as hydrogen halide/equilibration catalysts in the form of a proton acid (DT-OS (German Published Specification) No. 2,453,482) or hydrogen halides/peralkylated acid amide (DT-OS (German Published Specification) No. 2,353,166) have recently been described in connection with the reaction of organochlorosilanes with polyorganosiloxanes.

However, the hydrolytic processes have fundamental disadvantages. The water required for the hydrolysis cannot be added to the chlorosilanes as rapidly as desired, so that long reaction times result. A proportion of the still unreacted chlorosilanes is thereby additionally entrained by the hydrochloric acid which escapes as a gas and this leads to losses, and difficulties in the reproducibility of the desired products. Industrially expensive installations for the condensation of at least a proportion of the silanes escaping are therefore also necessarily required. Most processes also additionally use expensive solvents which constitute a fire hazard.

In some of the previously disclosed reactions of chlorosilanes with organosiloxanes, preferably cyclic siloxanes, only oligomeric chlorosiloxanes with up to a maximum of 10 siloxy units are obtained. In the case of processes which employ phosphine oxides or quaternary ammonium salts as catalysts, the catalyst is indeed able to open the cyclic siloxanes used and to add on the chlorosilane, but it proves to be incapable of equilibrating the siloxane bond in the chlorosiloxanes formed. The chain length or the molecular weight of the chlorosiloxanes is thus determined in practice by the size of the ring of the cyclic siloxane.

The long reaction times and, in some cases, the use of solvents may also be mentioned, above all, as further disadvantages.

The use of Lewis acids, such as iron-III chloride or iron-III chloride hexahydrate, with or without hydrogen chloride, as described in U.S. Pat. No. 2,381,366, under the conditions according to the invention also does not lead to chlorosiloxanes which are satisfactorily equilibrated (DT-OS (German Published Specification) No. 2,453,482, compare Example II and III).

The use of Lewis acids, above all iron-III chloride, has considerable disadvantages. This catalyst is suitable only for the preparation of chlorosiloxanes which can be distilled, if only for the reason that the reaction mixtures are colored very dark by the dissolved $FeCl_3$ and are thus unsuitable for many intended uses. Economical removal or deactivation of this catalyst is difficult, but absolutely necessary. The presence of $FeCl_3$ prohibits the freeing of high-molecular products from undesired low-molecular, above all cyclic, siloxane constituents in the customary manner by thermal devolatilization (distilling (off)). The iron-III chloride present reforms these low-molecular constituents, according to the equilibrium, during the process of thermal devolatilization, and during the subsequent storage of the products. (Compare DT-OS (German Published Specification) No. 2,453,482, comparison example III). The known equilibration catalysts, in the form of proton acids, for siloxanes also do not exhibit, or do not exhibit in a reproducible manner, their equilibrating action in the reaction between chlorosilanes and siloxanes.

As has been shown in DT-OS (German Published Specification) No. 2,453,482 (comparison example IV), even using the fastest known proton acid equilibration catalysts for siloxanes, that is to say perfluoroalkanesulphonic acids, does not lead to equilibrated chlorosiloxanes; catalyst mixtures (DT-OS (German Published Specification) Nos. 2,453,482 and 2,353,166) in general necessitate closed vessels to achieve optimum results, in order to avoid the HCl escaping. These processes are thus unsuitable if pressure vessels are to be dispensed with.

According to DT-AS (German Published Specification) No. 1,039,516, acetoxy-containing polyorganosiloxanes can be prepared in a reaction time of 40 hours by reaction of acetic acid or its anhydride with polyorganosiloxanes in the presence of acid catalysts at temperatures from 136°–147° C. A serious disadvantage of this process is that, apparently, single products are not formed (compare DT-AS German Published Specification) No. 1,218,446). The reaction time is to be regarded as a further disadvantage. The reaction of acetoxysilanes (DT-AS (German Published Specification) No. 1,218,446) with hexamethylcyclosiloxane or octamethyltetracyclosiloxane in the presence of Friedel-Crafts catalysts leads, as Example 2 hereinbelow shows, to products which are not equilibrated. Non-cyclic organosiloxanes cannot be reacted with acetoxysilanes by this process.

If the Friedel-Crafts catalyst is replaced by an acid, according to U.S. Pat. No. 3,322,722 acetoxy-containing polyorganosiloxanes are likewise formed. A fundamental disadvantage of this process is that acetoxy compounds which are frequently in the form of solids (compare, for example, methyltriacetoxysilane and tetraacetoxysilane) and which must always be prepared separately are used as starting components (see also DAS (German Published Specification) No. 1,218,446. A further substantial disadvantage is, as shown in Examples 1 and 3 hereinbelow, the considerable reaction time of 23 or 36 hours, respectively, at temperatures of about 100° C.

The object of the present invention was thus to discover a process which is free from all the disadvantages noted above, that is to say which 1. is based on easily manageable starting substances obtained on a large industrial scale, such as (a) (organo)-chlorosilanes and (b) linear and also cyclic polyorganosiloxanes,
2. can be carried out under normal pressure and without cooling extending beyond customary water-cooling,
3. proceeds at temperatures below 140° C.,
4. can be carried out within a maximum reaction time of 5 hours,
5. gives equilibrated, linear or branched (also tetrafunctional) readily reproducible compounds,
6. permits thermal devolatilization of the end product without decomposition thereby taking place through the equilibration catalyst still present, and
7. gives silicon-functional products which can easily be reacted with compounds containing active hydrogen.

A process has now been found which corresponds entirely to all the above requirements.

Reproducible (compare Example 1–4), silicon-functional polyorganosiloxanes can be prepared with short reaction times and in almost quantitative yield by reaction of a chlorosilane with polyorganosiloxanes in the presence of non-volatile equilibration catalysts, in the form of proton acids, in monobasic carboxylic acids, in particular acetic acid, at temperatures up to 135° C.

The present invention thus relates to a process for the preparation of linear and branched, equilibrated, mixed acyloxy-containing and chlorine-containing organopolysiloxanes by reaction of a chlorosilane of the formula $$R_aR'_bSiCl_{(4-a-b)}$$

wherein
a=0, 1, 2 or 3,
b=0, 1, 2 or 3 and
a+b is at most 3,
or partial hydrolysis products thereof, with one or more organosiloxanes which can contain, in appropriately alternating arrangement, the following units $$[R_2R''—SiO_{\frac{1}{2}}] \ [RR''—SiO] \ [R''—SiO_{3/2}] \ [SiO_2]$$

wherein
R and R' independently of one another is hydrogen or an aliphatic, aromatic, saturated or unsaturated, optionally halogen-substituted or cyano-substituted monovalent hydrocarbon radical with up to 18 C atoms, and
R" is chlorine or hydroxyl, or has the meaning indicated for R and R',
in proportions such that the number of all the Si—Cl groups always exceeds the number of all the Si—OH groups, which is characterized in that the reaction is carried out in the presence of a combination of an equilibration catalyst, in the form of a proton acid, for siloxanes, which is in itself known and, relative to the silicon-bonded chlorine atoms, at least about 1.1 times the molar amount of concentrated monobasic carboxylic acid, in particular acetic acid, at temperatures up to a maximum of about 135° C.

The choice of possible equilibration catalysts, such as, for example, sulphuric acid, perfluorosulphonic acids, bleaching earths and the like, depends on the desired reaction conditions and properties of the reaction products. Perfluoroalkanesulphonic acids $$R_F SO_3H$$

wherein
$R_F$ is a perfluorinated alkyl radical with up to 10 C atoms,
are preferably employed, in amounts of about 0.05 to 1% by weight, preferably about 0.2–0.5% by weight. The $R_F$ radical can be, for example, the $CF_3$, $C_2F_5$ or $C_8F_{17}$ radical. The perfluorobutane radical is a preferred $R_F$ radical. The % data relate to the silicon compounds present.

Possible silanes are: trimethylchlorosilane, dimethylvinylchlorosilane, dimethylphenylchlorosilane, chloropropyldimethylchlorosilane, chloromethyldimethylchlorosilane, bromomethyldimethylchlorosilane, dimethyldichlorosilane, methylvinyldichlorosilane, methylphenyldichlorosilane, 3,3,3-trifluoropropylmethyldichlorosilane, diphenyldichlorosilane, chloropropylmethyldichlorosilane, methyltrichlorosilane, chloromethylmethyldichlorosilane, bromomethylmethyldichlorosilane, methyltrichlorosilane, chloromethyltrichlorosilane, vinyltrichlorosilane, phenyltrichlorosilane and silicon tetrachloride.

Suitable siloxanes are preferably the direct hydrolysis products of dimethyldichlorosilane, such as are obtained on a large industrial scale as precursors for the production of cyclosiloxanes, and the cyclosiloxanes:

$$(RR'—SiO)_n \text{ with } n=3 \text{ to } 5$$

wherein
R and R' have the meaning already given.
Further possible siloxanes are, above all, any linear and branched siloxanes, the preparation of which is familiar to the expert. These siloxanes can likewise contain silicon-functional groups, such as Si—OH or Si—Cl, or also organofunctional side groups, such as Si-vinyl, —Si—CH₂Cl and the like.

In general, the reaction is carried out by mixing the organopolysiloxane with the calculated amounts of chlorosilane. The catalyst is then added. Thereafter, the mixture is warmed, preferably to about 50°–90° C., A slight evolution of HCl can be detected with the aid of, for example, a Bloren meter downstream from the condenser, while the viscosity of the contents of the flask increases somewhat. When the desired temperature has been reached, the chosen carboxylic acid is added, with further heating, in a manner such that the evolution of HCl does not get out of control. When addition of the carboxylic acid is complete, the mixture is stirred at about 120°–130° C. for about 1–2 hours and volatile material is then distilled off (for example up to about 130° C. under about 67 mbars).

The residue, which can have a colorless and water-clear to slightly yellowish appearance, depending on the quality of the materials employed, is a mobile liquid which is highly sensitive to water. The carboxylic acids should be as pure as possible and contain no compounds which can undergo reactions with, for example, the SiCl grouping or SiOAc grouping.

After removing the carboxylic acid (in vacuo) the equilibration reaction ceases immediately. The thorough heating to remove low-molecular constituents, such as, for example, octamethylcyclotetrasiloxane, thus becomes problem-free.

Because of the favorable reaction conditions and the short reaction times, a continuous preparation can be carried out without problems. Examples of monobasic carboxylic acids which can be employed are acetic acid, propionic acid or also higher carboxylic acids. However, acetic acid is preferred.

The present invention is illustrated in more detail in the examples which follow (unless otherwise indicated, % data relate to % by weight; D denotes a difunctional unit —OSi(R$_2$)— and Ac represents the acetyl radical).

For brevity, in some cases the residual chlorine contents are not indicated in the examples. They vary between about 0.2 and 3.0%. In some cases, they have been converted to the particular corresponding acetoxy values.

EXAMPLES 1-4

129 g [1 mol] dimethylchlorosilane and 1.7 g [0.3%] of perfluorobutanesulphonic acid are added to 444 g [1.5 mols] of octamethylcyclotetrasiloxane [D$_4$] and the components are mixed. The mixture is then heated to 90° C. and 240 g [4.0 mols] of acetic acid are added in the course of 30 minutes. When the addition has been completed, the temperature is increased to 125°-130° C. The mixture is stirred at this temperature for about 2 hours. Thermal devolatilization is then carried out up to 90° C. (sump temperature) and under 20 mbars. The residue is a clear mobile liquid.

See Table 1 for the results.

Table 1:

| Example [No.] | 1 | 2 | 3 | 4 |
|---|---|---|---|---|
| Yield [g] | 597 | 595 | 596 | 601 |
| OAc [%] | 18.2 | 18.24 | 18.1 | 18.6 |
| Viscosity $^{20}$[cP] | 6.85 | 6.90 | 6.85 | 6.90 |
| Gas chromatogram of the vaporized portion (= vD) | | | | |
| vD [%] | 63.73 | 63.58 | 68.96 | 66.05 |
| D$_4$ [%] | 4.56 | 4.0 | 3.9 | 4.2 |
| D$_5$ [%] | 2.90 | 2.9 | 3.7 | 3.0 |
| D$_6$ [%] | 0.75 | 1.1 | 1.1 | 1.0 |
| D$_7$ [%] | 0.40 | 0.7 | 0.8 | 0.8 |
| AcOD$_n$Ac | | | | |
| n = 1 [%] | 0.96 | 1.14 | 1.27 | 1.29 |
| n = 2 [%] | 8.72 | 8.60 | 8.51 | 8.52 |
| n = 3 [%] | 12.68 | 12.11 | 11.35 | 12.19 |
| n = 4 [%] | 11.46 | 10.96 | 10.75 | 10.78 |
| n = 5 [%] | 10.41 | 10.01 | 10.13 | 9.75 |
| n = 6 [%] | 9.36 | 8.97 | 9.02 | 8.95 |
| n = 7 [%] | 8.34 | 7.98 | 7.87 | 7.72 |
| n = 8 [%] | 7.04 | 6.91 | 6.86 | 6.60 |
| n = 9 [%] | 5.81 | 5.73 | 5.46 | 5.50 |
| n = 10 [%] | 4.47 | 4.64 | 4.50 | 4.32 |
| n = 11 [%] | 3.41 | 3.80 | 3.88 | 3.51 |
| n = 12 [%] | 3.26 | 2.98 | 3.1 | 2.65 |
| etc. | | | | |

The chlorosiloxanes present in small amounts were not taken into consideration in the evaluation of the gas chromatogram.

EXAMPLES 5-6

598 g [4 mols] of methyltrichlorosilane are reacted with 4,440 g [15 mols] of D$_4$, 1,200 g [20 mols] of acetic acid and 15.12 g [0.3%] of perfluorobutanesulphonic acid as in Example 1-4.

| Experiment No. | Yield [g] | Acetate [%] |
|---|---|---|
| 5 | 5097.3 | 12.65 |
| 6 | 5054.6 | 15.52 |

EXAMPLE 7

1/10 of the mixture in Example 5 was reacted as in this example. However, the thermal devolatilization conditions were as follows:
Sump temperature: 130° C.
Pressure: 67 mbars
Yield: 511 g
Acetate: 12.22%

EXAMPLE 8

888 g [3 mols] of D$_4$ are warmed to 50° C.; 3.4 g [0.33%] of perfluorobutanesulphonic acid are then added. After 45 seconds, an increase in viscosity can be detected. 149.5 g [1 mol] of methyltrichlorosilane are now added and, after a further 5 minutes, 300 g [5 mols] of acetic acid are added. The mixture is heated slowly. A reflux can be detected from 100° C. The temperature is increased to 130° C. in the course of one hour. The mixture is stirred at this temperature for 2 hours. Thermal devolatilization is then carried out at 130° C. and under 67 mbars.
Yield: 1,025 g
Acetate: 14.77%

EXAMPLES 9-10

299 g [2 mols] of methyltrichlorosilane are stirred with 2,664 g [9 mols] of D$_4$, 600 g [10 mols] of acetic acid and 9 g [0.3%] of perfluorobutanesulphonic acid. The mixture is heated carefully, so that the escaping stream of HCl remains controllable by means of a Liebig condenser. After about 2 hours, 130° C. has been reached. The mixture is stirred at this temperature for a further 2 hours. Thermal devolatilization is then carried out at 130° C. and under 67 mbars.

| Experiment No. | Yield [g] | Acetate [%] |
|---|---|---|
| 9 | 2979.6 | 10.9 |
| 10 | 2962.9 | 11.2 |

EXAMPLE 11

9 g [0.3%] of perfluorobutanesulphonic acid and then 2,664 g [9 mols] of D$_4$ are added to 299 g [2 mols] of methyltrichlorosilane. The mixture is then heated to 90° C. and 600 g [10 mols] of acetic acid are added in the course of 2 hours. During the addition, the mixture is further heated up, so that when addition is complete [stream of HCl ceases] a temperature of 130° C. is reached. The mixture is then stirred at 130° C. for 2 hours. Thermal devolatilization is carried out at 130° C. and under 67 mbars.
Yield: 2,949.7 g
Acetate: 11.1%

EXAMPLE 12

448.5 g [3 mols] of methyltrichlorosilane and 4,662 g [63 mols] of $D_4$ are mixed, 17 g [0.33%] of perfluorobutanesulphonic acid are added and the mixture is heated to 90° C. in the course of 30 minutes. 1,500 g [25 mols] of acetic acid are added over a period of 3 hours. The temperature is brought to 130° C. during the addition. Distillation is then carried out at 130° C. and under 67 mbars.

Yield: 5,033 g
Acetate: 9.87%

EXAMPLE 13

Experiment a 19.35 g [0.15 mol] of dimethyldichlorosilane and 3.4 g of perchlorobutanesulphonic acid are added to 1,000 g of a hydrolysis product of dimethyldichlorosilane, containing about 600 milliequivalents of OH originating from $H_2O$ and SiOH, and the mixture is heated to 90° C. in the course of 30 minutes. 117 g [0.78 mol] of methyltrichlorosilane are added in the course of one hour, while increasing the temperature. When the addition is complete the mixture is boiled under reflux for 2 hours. Thermal devolatilization is carried out at 130° C. and under 67 mbars.

Experiment b

The above experiment is repeated, except for the difference that 38.7 g [0.3 mol] of dimethyldichlorosilane are added.

Experiment c

Experiment a was carried out in a manner such that no dimethyldichlorosilane is added and thus OH is not taken into consideration.

Results:

| Experiment no. | 13 a    | 13 b  | 13 c  |
|----------------|---------|-------|-------|
| Yield [g]      | 1,100 g | 1,130 | 1,100 |
| Acetate [%]    | 10.6    | 11.5  | 9.1   |

EXAMPLE 14

500 g of a higher-molecular α,ω-polydimethylsiloxanediol of viscosity $\eta^{20}=600$ cP [6.7 mols of $(CH_3)_2SiO$] are mixed with 145 g [1.13 mols] of dimethyldichlorosilane and 2 g of perfluorobutanesulphonic acid, and 270 g of acetic acid are added. The mixture is warmed rapidly to 100° C. It is then stirred at temperatures of 100°–130° C. for about 3 hours. Thermal devolatilization is carried out at 90° C. and under 20 mbars. The OH content of the siloxanediol is not taken into consideration.

Yield: 651 g
Viscosity: 7.3 cP
Acetate: 16.73%

Gas chromatogram of the vaporizable constituents (=48.88%): $D_4$: 6.60%; $D_5$: 3.93%; $D_6$: 0.97%; $D_7$: 0.19%; $AcOD_nAc$: n=1: 0.70%; n=2: 8.07%; n=3: 11.44%; n=4: 11.71%; n=5: 11.06%; n=6: 9.60%; n=7: 7.72%; n=8: 6.25; n=9 4.82; etc.

EXAMPLE 15

170 g [1 mol] of silicon tetrachloride are mixed with 1,184 g [4 mols] of octamethyltetracyclosiloxane and 4.062 g of perfluorobutanesulphonic acid and the mixture is heated to 90° C. 600 g of acetic acid are then added over a period of 1 hour, while simultaneously heating carefully. The mixture is stirred at 125° C. for about 2 hours. Thermal devolatilization is carried out at 105° C. and under 28 mbars. A water-clear mobile liquid is formed.

Yield: 1,387 g
Acetate: 14.06%

EXAMPLE 16

149.5 g [1.0 mol] of methyltrichlorosilane are mixed with 1,110 g [3.75 mols] of octamethyltetracyclosiloxane and 7.6 g of concentrated $H_2SO_4$ [0.6%, relative to the silicon compounds]. 60 g of acetic acid are added to this mixture and the mixture is then heated to about 125° C. in the course of ½ an hour. 340 g of acetic acid are added at this temperature in the course of 40 minutes. The mixture is then stirred at 125° C. for 2 hours. Thermal devolatilization is carried out at 100° C. and under 20 mbars. A slightly opalescent mobile liquid is formed.

Yield: 1,213.9 g
Acetate: 9.8%
Chloride: 0.31%
Sulphate: 0.59%

EXAMPLE 17

149.5 g [1.0 mol] of methyltrichlorosilane are mixed with 1,110 g [3.75 mol] of octamethyltetracyclosiloxane and 3.6 g [0.28%] of perfluorobutanesulphonic acid. The mixture is heated to 60° C. in the course of 20 minutes. 300 g [about 4 mols] of propionic acid are added, in the course of 2 hours, while further heating, starting from this temperature. During this addition, a temperature of 120° C. is reached after about 18 minutes. The mixture is then stirred at 130° C. for 1.5 hours.

Thermal devolatilization is carried out at 140° C. and under about 7 mbars. A clear, mobile, colourless liquid remains.

Yield: 1,210 g
$CH_3CH_2CO$: 9.95%
Cl: 2.10%

It will be appreciated that the instant specification and examples are set forth by way of illustration and not limitation, and that various modifications and changes may be made without departing from the spirit and scope of the present invention.

What is claimed is:

1. A process for the preparation of an equilibrated acyloxy-containing organopolysiloxane comprising reacting at a temperature of up to about 135° C. a chlorosilane of the formula $$R_aR'_bSiCl_{(4-a-b)}$$

wherein
a=0, 1, 2 or 3
b=0, 1, 2 or 3, and
a+b is at most 3, or a partial hydrolysis product thereof, with one or more organosiloxanes, which can contain in appropriately alternating arrangement the units $$[R_2R''-SiO_{\frac{1}{2}}] \ [RR''-SiO] \ [R''-SiO_{3/2}] \ [SiO_2]$$

wherein
R and R' each independently is hydrogen or an aliphatic, aromatic saturated or unsaturated optionally halogen or cyano-substituted monovalent hydrocarbon radical with up to 18 C atoms, and R'' is hydrogen, chlorine, hydroxyl, or an optionally halogen or cyano-substituted monovalent hydrocarbon radical with up to 18 C atoms, in the presence of a proton acid siloxane-equilibration catalyst, and at least about 1.1 times the molar amount of a monobasic carboxylic acid based on the silicon-bonded chlorine atom, the number of all the Si—Cl groups in the reactants exceeding the number of all the Si—OH groups.

2. A process according to claim 1, wherein the catalyst is a perfluoroalkanesulphonic acid present in about 0.05 to 1.5% by weight of the silicon-containing reactants.

3. A process according to claim 1, wherein the carboxylic acid is acetic acid.

4. A process according to claim 3, wherein the catalyst is perfluorobutanesulphonic acid present in about 0.2 to 0.4% by weight of the silicon-containing reactants.